(12) United States Patent
Brodersen et al.

(10) Patent No.: US 7,743,341 B2
(45) Date of Patent: Jun. 22, 2010

(54) RENDERING ICONS ALONG A MULTIDIMENSIONAL PATH HAVING A TERMINUS POSITION

(75) Inventors: Rainer Brodersen, San Jose, CA (US); Rachel Clare Goldeen, Mountain View, CA (US); Jeffrey Ma, Redwood City, CA (US); Mihnea Calin Pacurariu, Los Gatos, CA (US); Thomas Michael Madden, Sunnyvale, CA (US); Steven Jobs, Palo Alto, CA (US); Jeff Robbin, Los Altos, CA (US); Eric Taylor Seymour, San Jose, CA (US)

(73) Assignee: Apple Inc., Cupertino, CA (US)

( * ) Notice: Subject to any disclaimer, the term of this patent is extended or adjusted under 35 U.S.C. 154(b) by 263 days.

(21) Appl. No.: 11/530,796

(22) Filed: Sep. 11, 2006

(65) Prior Publication Data

US 2008/0066013 A1    Mar. 13, 2008

(51) Int. Cl.
*G06F 3/048* (2006.01)
(52) U.S. Cl. .................. 715/810; 715/767; 715/838; 345/640
(58) Field of Classification Search ............... 715/767, 715/763, 810, 819, 825, 829, 716, 720, 727, 715/730, 739, 782, 783, 785, 802, 815, 818, 715/821, 823, 835, 836, 838, 848, 850, 855, 715/860; 345/619, 634, 639, 640
See application file for complete search history.

(56) References Cited

U.S. PATENT DOCUMENTS

| | | | |
|---|---|---|---|
| 5,619,249 A | 4/1997 | Billock et al. | |
| 5,717,879 A | 2/1998 | Moran et al. | |
| 5,822,123 A | 10/1998 | Davis et al. | |
| 5,880,768 A | 3/1999 | Lemmons et al. | |
| 6,006,227 A | 12/1999 | Freeman et al. | |
| 6,335,737 B1 | 1/2002 | Grossman et al. | |
| 6,448,987 B1 | 9/2002 | Easty et al. | |
| 6,638,313 B1 | 10/2003 | Freeman et al. | |
| 6,725,427 B2 | 4/2004 | Freeman et al. | |
| 6,768,999 B2 | 7/2004 | Prager et al. | |
| 6,944,632 B2 | 9/2005 | Stern | |
| 7,292,243 B1 * | 11/2007 | Burke | 345/440 |
| 7,362,331 B2 | 4/2008 | Ording | |
| 7,363,591 B2 | 4/2008 | Goldthwaite et al. | |
| 2002/0033848 A1 | 3/2002 | Sciammarella et al. | |

(Continued)

FOREIGN PATENT DOCUMENTS

EP          1469375 A1          10/2004

(Continued)

OTHER PUBLICATIONS

U.S. Appl. No. 11/530,824, Sep. 11, 2006, Madden et al.

(Continued)

*Primary Examiner*—Ba Huynh
*Assistant Examiner*—Enrique W Iturralde
(74) *Attorney, Agent, or Firm*—Fish & Richardson P.C.

(57) ABSTRACT

Icons are arranged in foreground background positions in an interface environment to define a multidimensional path extending from a terminus. The icons transition between the foreground position and the background positions along the multidimensional path.

35 Claims, 9 Drawing Sheets

U.S. PATENT DOCUMENTS

| | | |
|---|---|---|
| 2002/0083469 A1 | 6/2002 | Jeannine et al. |
| 2002/0175931 A1 | 11/2002 | Holtz et al. |
| 2003/0110450 A1 | 6/2003 | Sakai |
| 2003/0117425 A1 | 6/2003 | O'Leary et al. |
| 2003/0142751 A1 | 7/2003 | Hannuksela |
| 2003/0174160 A1 | 9/2003 | Deutscher et al. |
| 2004/0008211 A1 | 1/2004 | Soden et al. |
| 2004/0100479 A1* | 5/2004 | Nakano et al. ............ 345/700 |
| 2004/0140995 A1 | 7/2004 | Goldthwaite et al. |
| 2004/0150657 A1 | 8/2004 | Wittenburg et al. |
| 2004/0261031 A1 | 12/2004 | Tuomainen et al. |
| 2005/0041033 A1 | 2/2005 | Hilts et al. |
| 2005/0044499 A1 | 2/2005 | Allen et al. |
| 2005/0091597 A1 | 4/2005 | Ackley |
| 2005/0160375 A1 | 7/2005 | Sciammarella et al. |
| 2005/0246654 A1 | 11/2005 | Hally et al. |
| 2005/0278656 A1 | 12/2005 | Goldthwaite et al. |
| 2006/0020962 A1 | 1/2006 | Stark et al. |
| 2006/0031776 A1 | 2/2006 | Glein et al. |
| 2006/0265409 A1 | 11/2006 | Neumann et al. |
| 2007/0162853 A1 | 7/2007 | Weber et al. |
| 2007/0288863 A1 | 12/2007 | Ording et al. |
| 2008/0062894 A1 | 3/2008 | Ma et al. |
| 2008/0065638 A1 | 3/2008 | Brodersen et al. |
| 2008/0065720 A1 | 3/2008 | Brodersen et al. |
| 2008/0066010 A1 | 3/2008 | Brodersen et al. |
| 2008/0066110 A1 | 3/2008 | Brodersen et al. |
| 2008/0092168 A1 | 4/2008 | Logan et al. |
| 2008/0122870 A1 | 5/2008 | Brodersen et al. |

FOREIGN PATENT DOCUMENTS

| | | |
|---|---|---|
| EP | 1510911 A2 | 3/2005 |

OTHER PUBLICATIONS

"Fading Image Rollovers," http://web.archive.org/web/20060111080357/http://www.javascript-fx.com/fade_rollovers/general_help/help.html. Jan. 11, 2006, 1 page.

"Animated Image Blur," http://web.archive.org/web/20060430062528/http://www.tutorio.com/tutorial/animated-image-blur, Apr. 30, 2006, 2 pages.

* cited by examiner

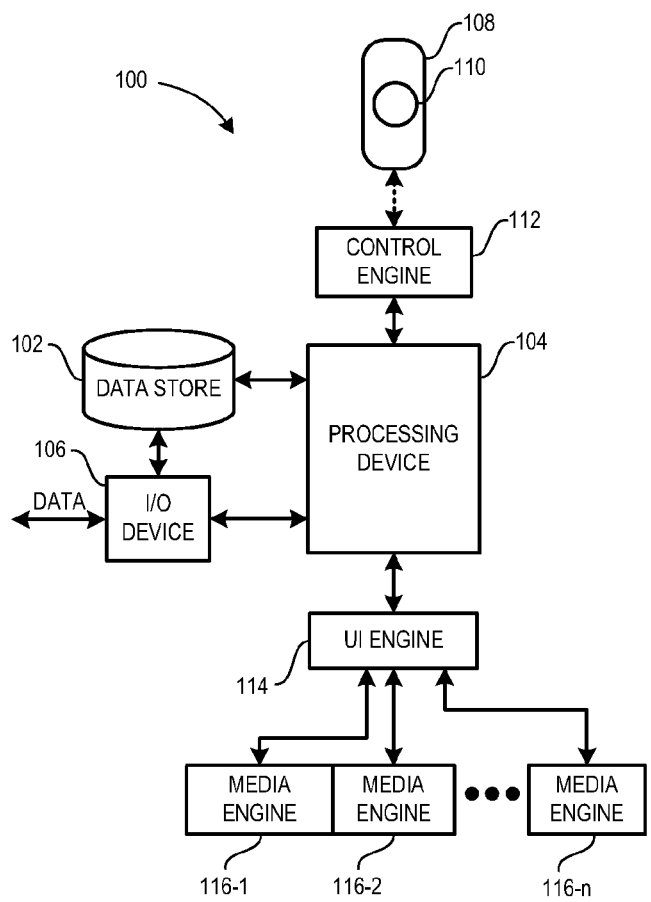
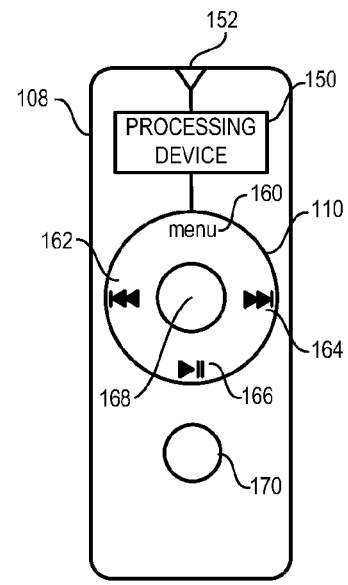
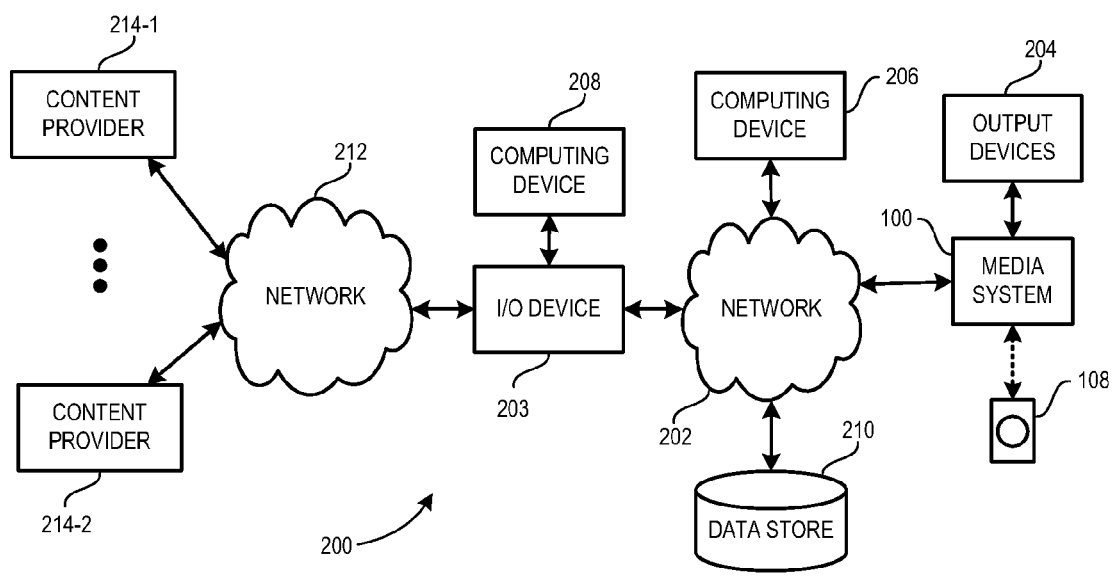

RENDERING ICONS ALONG A MULTIDIMENSIONAL PATH HAVING A TERMINUS POSITION

BACKGROUND

This disclosure is related to media processing systems and methods.

Media devices, such as digital video and audio players, can include multiple functions and capabilities, such as playing stored content, browsing and selecting from recorded content, storing and/or receiving content selected by a user, and the like. These various functions can often be grouped according to content types, e.g., movies, music, television programs, photos, etc. The functions can then be accessed through various user interfaces that are typically arranged in a hierarchal manner, having a "root" or "home" user interface at the top of the hierarchy. The user interface can include both graphical and textual features. It is desirable that the user interface conveys information to the user in an intuitive manner, and readily provides access to various functions.

SUMMARY

Disclosed herein are systems and methods for presenting icons in an interface environment. In one implementation, a user interface includes a plurality of icons. At least one of the icons is arranged in a foreground position and the remaining icons are arranged in background positions in the interface environment. The foreground and background positions define a multidimensional path. One of the background positions defines a terminus position representative of a terminus of the multidimensional path, and the icons transition between the foreground position and the background positions along the multidimensional path.

In another implementation, an icon is displayed in a foreground position in a display area and one or more icons are displayed in one or more background positions in the display area. The icons are arranged according to a multidimensional path extending from a terminus, and transition to and from the foreground position and to and from the one or more background positions along the multidimensional path.

In another implementation, a system includes a processing device and a user interface engine. The user interface engine is executable by the processing device, and is configured to display icons in foreground and background positions in a user environment, and arrange the icons displayed in the foreground and background positions according to a multidimensional path in the user environment so that the multidimensional path intersects an edge of the user environment. The user interface engine is also configured to transition the icons through the foreground position and background positions along the multidimensional path.

BRIEF DESCRIPTION OF THE DRAWINGS

FIG. 1 is a block diagram of an example media processing system.

FIG. 2 is a block diagram of an example remote control device for the media processing system.

FIG. 3 is an example network environment in which a media processing system in accordance with FIG. 1 may be implemented.

DETAILED DESCRIPTION

Figure 4:
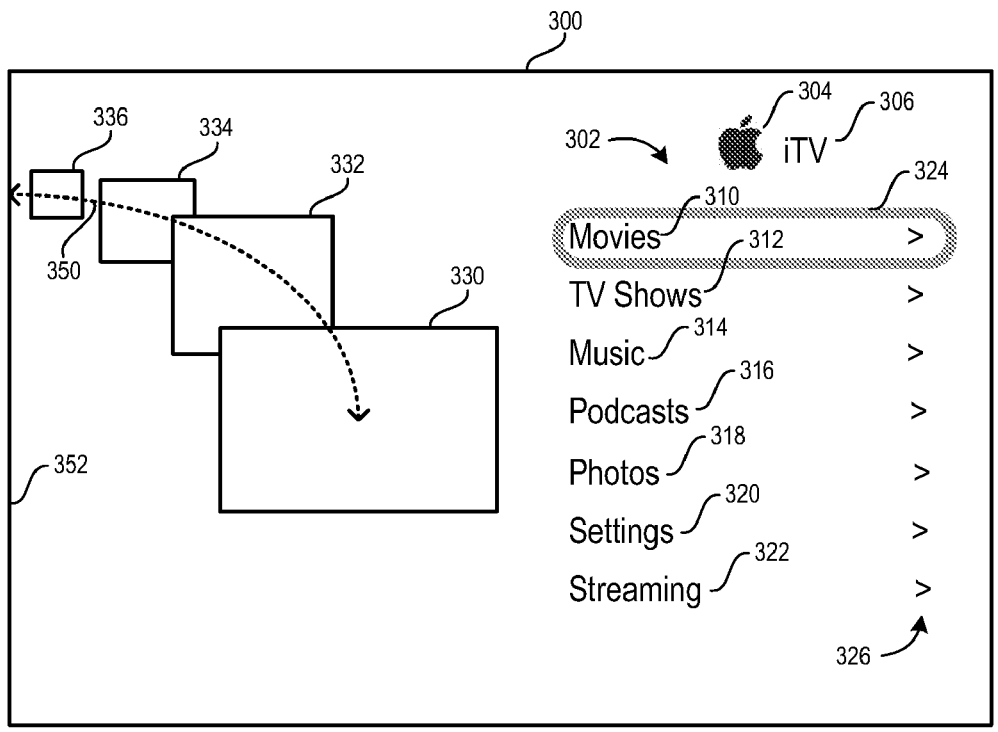
FIG. 4 is a block diagram of an example media menu interface environment.

FIG. 1 is a block diagram of an example media processing system 100. The media processing system 100 can transmit and receive media data and data related to the media data. The media data can be stored in a data store 102, such as a memory device, and be processed by a processing device 104 for output on a display device, such as a television, a computer monitor, a game console, a hand held portable device, and the like, and/or an audio device, such as a multi-channel sound system, a portable media player, a computer system, and the like. The media processing system 100 may be used to process media data, for example, video data and audio data received over one or more networks by an input/output (I/O) device 106. Such media data may include metadata, e.g., song information related to audio data received, or programming information related to a television program received.

The media data and related metadata may be provided by a single provider, or may be provided by separate providers. In one implementation, the media processing system 100 can be configured to receive media data from a first provider over a first network, such as a cable network, and receive metadata related to the video data from a second provider over a second network, such as a wide area network (WAN). Example media data include video data, audio data, content payload data, or other data conveying audio, textual and/or video data.

In another implementation, the media processing system 100 can be configured to receive media data and metadata from a computing device, such as a personal computer. In one example of this implementation, a user manages one or more media access accounts with one or more content providers through the personal computer. For example, a user may manage a personal iTunes® account with iTunes® software, available from Apple Computer, Inc. Media data, such as audio and video media data, can be purchased by the user and stored on the user's personal computer and/or one or more data stores. The media data and metadata stored on the personal computer and/or the one or more data stores can be selectively pushed and/or pulled for storage in the data store 102 of the media processing system 100.

In another implementation, the media processing system 100 can be used to process media data stored in several data stores in communication with a network, such as wired and/or wireless local area network (LAN), for example. In one implementation, the media processing system 100 can pull and/or receive pushed media data and metadata from the data stores over the network for presentation to a user. For example, the media processing system 100 may be implemented as part of an audio and video entertainment center having a video display device and an audio output device, and can pull media data and receive pushed media data from one or more data stores for storage and processing. At the entertainment center, a user can, for example, view photographs that are stored on a first computer while listening to music files that are stored on a second computer.

In one implementation, the media processing system 100 includes a remote control device 108. The remote control device 108 can include a rotational input device 110 configured to sense touch actuations and generate remote control signals therefrom. The touch actuations can include rotational actuations, such as when a user touches the rotational input device 110 with a digit and rotates the digit on the surface of the rotational input device 110. The touch actuations can also include click actuations, such as when a user presses on the rotational input device 110 with enough pressure to cause the remote control device 108 to sense a click actuation.

In one implementation, the functionality of the media processing system 100 is distributed across several engines. For example, the media processing system 100 may include a controller engine 112, a user interface (UI) engine 114, and one or more media engines 116-1, 116-2, and 116-n. The engines may be implemented in software as software modules or instructions, or may be implemented in hardware, or in a combination of software and hardware.

The control engine 112 is configured to communicate with the remote control device 108 by a link, such as a wireless infrared signal or radio frequency signal. The remote control device 108 can transmit remote control signals generated, for example, from touch actuations of the rotational input device 110 to the control engine 112 over the link. In response, the control engine 112 is configured to receive the remote control signals and generate control signals in response. The control signals are provided to the processing device 104 for processing.

The control signals generated by the control engine 112 and processed by the processing device 104 can invoke one or more of the UI engine 114 and media engines 116-1-116-n. In one implementation, the UI engine 114 manages a user interface to facilitate data presentation for the media engines 116-1-116-n and functional processing in response to user inputs.

In one implementation, the media engines 116 can include one or more content-specific engines, such as a movies engine, television program engine, music engine, and the like. Each engine 116 can be instantiated to support content-specific functional processing. For example, a movie engine to support movie-related functions can be instantiated by selecting a "Movies" menu item. Example movie-related functions include purchasing movies, viewing movie previews, viewing movies stored in a user library, and the like. Likewise, a music engine to support music-related functions can be instantiated by selecting a "Music" menu item. Example music-related functions include purchasing music, viewing music playlists, playing music stored in a user library, and the like.

The media processing system 100 of FIG. 1 can also implement different functional distribution architectures that have additional functional blocks or fewer functional blocks. For example, the engines 116 can be implemented in a single monolithic engine.

FIG. 2 is a block diagram of an example remote control device 108 for the media processing system 100. The remote control device 108 includes a rotational input device 110, a processing device 150, and a wireless communication subsystem 152. The rotational input device 110 defines a surface that can sense a touch actuation, such as the presence of a finger on the surface, and can further generate a control signal based on a rotation of the finger on the surface. In one implementation, a touch sensitive array is disposed beneath the surface of the rotational input device 110. The touch sensitive array can be disposed according to polar coordinates, i.e., r and θ, or can be disposed according to Cartesian coordinates, i.e., x and y.

The rotational input device areas 160, 162, 164, 166 and 168 are receptive to press actuations. In one implementation, the areas include a menu area 160, a reverse/previous area 162, a play/pause area 164, a forward/next area 166, and a select area 168. The areas 160-168, in addition to generating signals related to their descriptive functionalities, can also generate signals for context-dependent functionality. For example, the menu area 160 can generate signals to support the functionality of dismissing an onscreen user interface, and the play/pause area 164 can generate signals to support the function of drilling down into a hierarchal user interface. In one implementation, the areas 160-168 comprise buttons disposed beneath the surface of the rotational input device 110. In another implementation, the areas 160-168 comprise pressure sensitive actuators disposed beneath the surface of the rotational input device 110.

The processing device 150 is configured to receive the signals generated by the rotational input device 110 and generate corresponding remote control signals in response. The remote control signals can be provided to the communication subsystem 152, which can wirelessly transmit the remote control signals to the media processing system 100.

Although shown as comprising a circular surface, in another implementation, the rotational input device 110 can comprise a rectangular surface, a square surface, or some other shaped surface. Other surface geometrics that accommodate pressure sensitive areas and that can sense touch actuations may also be used, e.g., an oblong area, an octagonal area, etc.

Other actuation area configurations may also be used. For example, in another implementation, the remote control device 108 can also include a separate actuation button 170. In this implementation, the areas comprise a "+" or increase area 160, a reverse/previous area 162, a "−" or decrease area 164, a forward/next area 166, a play/pause area 168, and a menu area 170.

FIG. 3 is an example network environment 200 in which a media processing system 100 in accordance with FIG. 1 may be implemented. The media processing system 100 receives, for example, user input through a remote control device 108 and media data over a network 202, such as a wired or wireless LAN. In one implementation, the network 202 communicates with a wide area network 212, such as the Internet, through an I/O device 203, such as a router, server, cable modem, or other computing and/or communication processing device. The media processing system 100 processes the media data for output to one or more output devices 204. The media processing system 100 can receive the media data from one or more data stores connected to the network 202, such as computing devices 206 and 208, and a data store 210.

The media data can be received through the network 212 by one of the computing devices, such as computing device 208. The network 212 can include one or more wired and wireless networks, such as the Internet. The media data is provided by one or more content providers 214. For example, the content provider 214-1 may provide media data that is processed by the media processing system 100 and output through the output devices 206, and the content provider 214-2 may provide metadata related to the media data for processing by the media processing system 100. Such metadata may include episodic content, artist information, and the like. A content provider 214 can also provide both media data and related metadata.

In one implementation, the media processing system 100 can also communicate with one or more content providers 214 directly. For example, the media processing system 100 can communicate with the content providers the wireless network 202, the I/O device 203, and the network 212. The media processing system 100 can also communicate with the content providers 214 thorough other network configuration, e.g., through a direct connection to a cable modem, through a router, or through one or more other communication devices. Example communications can include receiving sales information, preview information, or communications related to commercial transactions, such as purchasing audio files and video files.

In another implementation, the media processing system 100 can receive content from any of the computing devices 206 and 208, and other such computing devices or data stores 210 available on the network 202 through sharing. Thus, if any one or more of the computing devices or data stores are unavailable, media data and/or metadata one the remaining computing devices or other such computing devices or data stores can still be accessed.

FIG. 4 is a block diagram of an example media menu interface environment 300. The example media menu interface environment 300 provides a menu interface from which one or more of a plurality of content-specific menus and corresponding functions may be selected.

In one implementation, the media menu interface environment 300 includes a media menu 302 identified in part by an icon 304 in a title location and a title 306, e.g., "iTv." The media menu 302 includes media menu items 310, 312, 314, 316, 318, 320 and 322, respectively entitled "Movies," "TV Shows," "Music," "Podcasts," "Photos," "Settings," and "Streaming." The media menu 302 can also include a highlight indicator 324 that highlights a media menu item. In one implementation, the highlight indicator 324 is a graphical indicator that provides the effect of a diffused backlighting, e.g., a glow highlight that provides the appearance of a backlit surface beneath the highlighted menu item.

A highlight selection of a menu item by the highlight indicator 324 indicates that the menu item is eligible for a further selection action, e.g., eligible to be selected by actuating the select area 168 on the rotational input device 110. The highlight indicator 324 can be moved vertically, for example, by actuating menu area 160 and the play/pause area 164 on the rotational input device 110.

Upon the further selection, a process associated with the highlighted menu item is performed. In one implementation, selection of the media menu item 310 when highlighted generates a movie content menu environment for processing media data related to movies, such as movie previews and full-length movies. Selection of the media menu item 312 when highlighted generates a TV Shows content menu environment for processing media data related to television programs, such as program episodes. Selection of the media menu item 314 when highlighted generates a Music content menu environment for processing media data related to music, such as audio files and music video files. Selection of the media menu item 316 when highlighted generates a Podcasts content menu environment for processing media data related to podcasts. Selection of the media menu item 318 when highlighted generates a Photos content menu environment for processing media data related to photos, such as photographs and videos. Selection of the media menu item 320 when highlighted generates a settings menu environment for changing settings of the media system, such as setting restrictions and shared files. Selection of the media menu item 322 when highlighted generates a Streaming menu environment for identifying and selecting media data stored on data stores or computer devices accessible through a network, such as media data stored on computing devices 206 and 208 and data store 210 and accessible over the network 202 of FIG. 2.

The media menu 302 can also include a child indicator 326 associated with a media menu item. The child indicator 326 indicates that one or more sub-menus or sub-items, e.g., folders, will become available or will be accessed upon selection of the corresponding media menu item.

The media menu interface environment 300 also includes media menu item abstractions that correspond to one or more of the media menu items. For example, the media menu item abstractions 330, 332, 334 and 336 correspond to media menu items 310, 312, 314 and 316, respectively. In one implementation, the media menu item abstractions are graphical representations of the content of corresponding media menu items. For example, the media menu item abstraction 330, which corresponds to the Movies media menu item 310, can be a movie icon. Likewise, the media menu item abstraction 332, which corresponds to the TV Shows media menu item 312, can be a television icon; the media menu item abstraction 334, which corresponds to the Music Media menu item 314, can be a music icon, etc.

In one implementation, the media menu item abstractions 330-336 are arranged such that at least one of the media menu item abstractions, e.g., icon 330, is in a foreground position, and the remaining the media menu item abstractions, e.g., icons 332-336, are in one or more background positions. The foreground and background positions define a multidimensional path 350, and the media menu item abstraction 336 is in a background position that defines a terminus of the multidimensional path. In one implementation, the terminus is at the edge 352 of the media menu interface environment 300.

In one implementation, the media menu item abstraction corresponding to a highlighted menu is displayed in the foreground position. For example, in FIG. 4, the media menu item abstraction 330, which corresponds to the highlighted Movies media menu item 310, is displayed in the foreground position.

In another implementation, one or more of the media menu item abstractions in the background positions may be displayed with an effect, e.g., a blurring effect. The blurring effect can be used to further deemphasize the media menu item abstractions. For example, in FIG. 4, the media menu items 332-336 can be blurred. In another implementation, a media menu item abstraction is blurred to a degree substantially or functionally proportional to the proximity of the media menu item abstraction to the foreground position. For example, the media menu item abstraction 336 can be extremely blurred, while the media menu item abstraction 332 can be only slightly out of focus.

In another implementation, media menu item abstractions are sealed in size, for example, substantially or functionally proportionally to the proximity of the media menu item abstraction to the foreground position. For example, the media menu item abstraction 336 can be displayed at approximately 20% of full scale, and the media menu item abstraction 330 can be displayed at 100% of full scale.

In one implementation, changing the position of the highlight indicator 324 causes the highlight indicator to transition form a highlighted media menu item to a media menu item to be highlighted, e.g., an adjacent media menu item. The transition of the highlight indicator 324 likewise causes the media menu item abstractions to transition between the foreground and background positions along the multidimensional path 350 until the media menu item abstraction corresponding to the newly-highlighted media menu item is in the foreground position.

Figure 5:
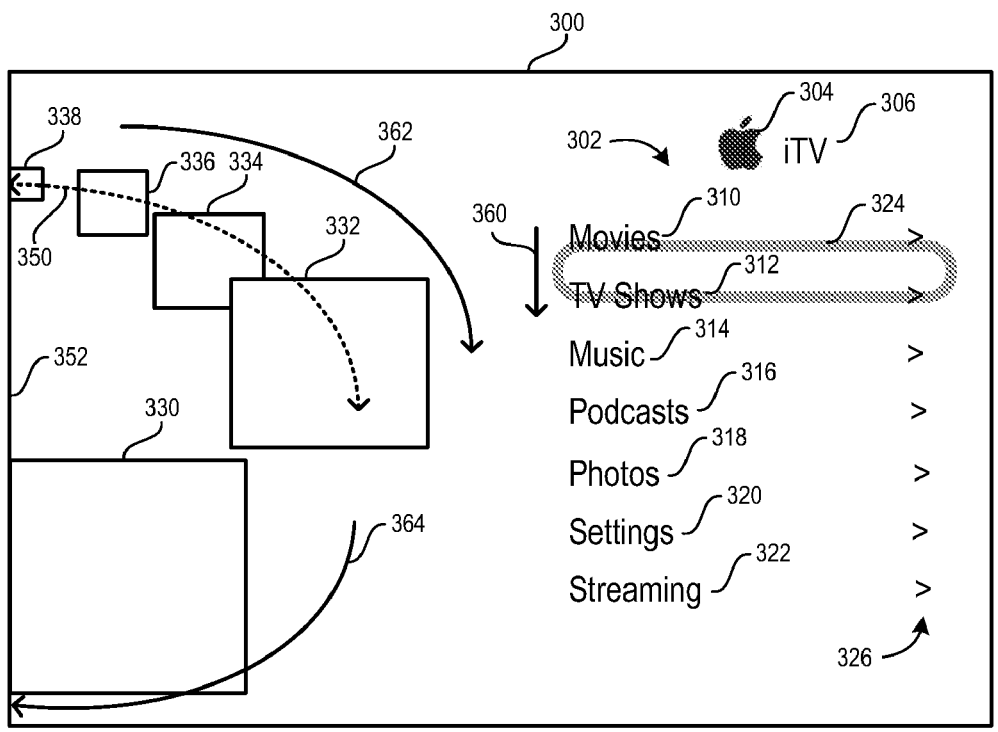
FIGS. 5 and 6 are block diagrams of an example transition of media icons in the media menu interface environment.
Figure 6:
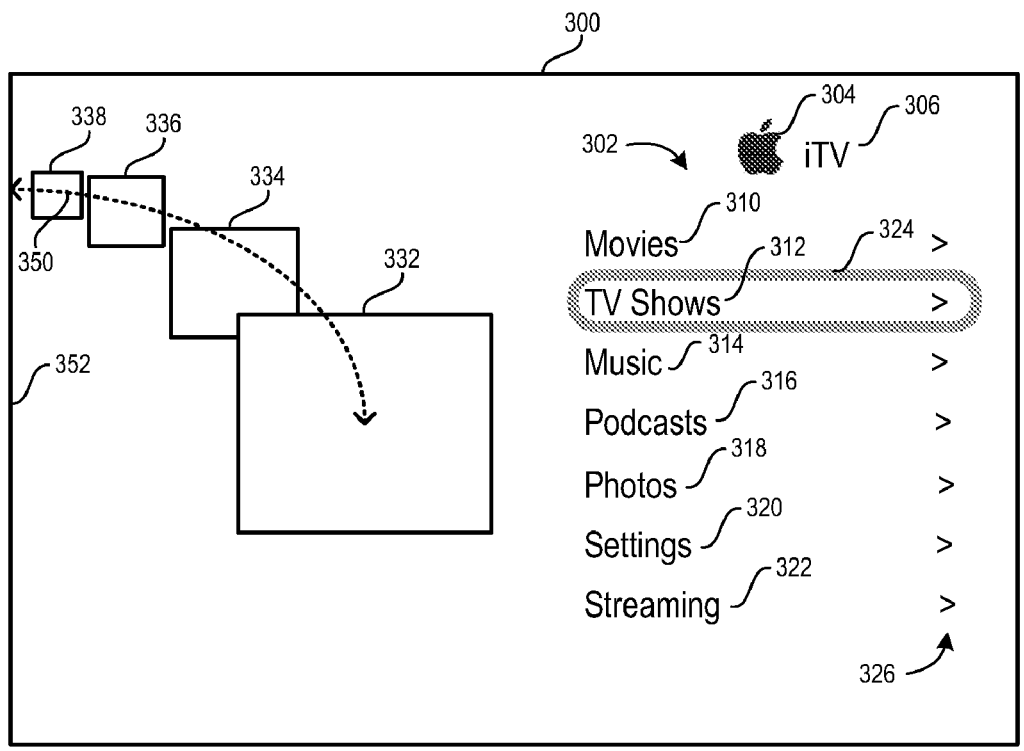

FIGS. 5 and 6 are block diagrams of an example transition of media menu item abstractions in the media menu interface environment 300. In FIG. 5, the highlight indicator 324 is transitioned from media menu item 310 to media menu item 312, as indicated by the directional arrow 360. In response, the media menu item abstractions 332, 334 and 336 transition along the multidimensional path 350, as indicated by the directional arrow 362. As the media menu item abstraction 336 transitions out of the terminus position, another media menu item abstraction 338, which corresponds to the Photos media menu item 318, emerges into the terminus position. In this implementation, the media menu item abstraction 338 emerges from the edge 352 of the media menu interface environment 300.

Because the media menu item abstraction 332 is transitioning from a background position into the foreground position previously occupied by media menu item abstraction 330, the media menu item abstraction 330 transitions out of the media menu interface environment 300, as indicated by directional arrow 364. In the example implementation shown in FIG. 5, the media menu item abstraction 330 transitions off the edge 352 of the media menu interface environment 300.

In one implementation, the scale of the media menu item abstraction transitioning off the edge 352 of the media menu interface environment 300 can be increased to simulate a "fly by" effect. For example, the scale of the media menu item abstraction 330 can be proportionally increased from 100% to 150% of full scale as the media menu item abstraction 330 transitions from the foreground position to the edge 352 of the media menu interface environment 300.

FIG. 6 is a block diagram of the end result of the transition of the menu abstractions in the media menu interface environment 300. The arrangement of the media menu item abstractions is similar to that of FIG. 4, except that the media menu item abstraction 332 is now in the foreground position and the media menu item abstractions 334, 336 and 338 are in the background positions. Likewise, the TV Shows media menu item 312, which corresponds to the media menu item abstraction 332 in the foreground position, is now highlighted by the highlight indicator 324.

Figure 7:
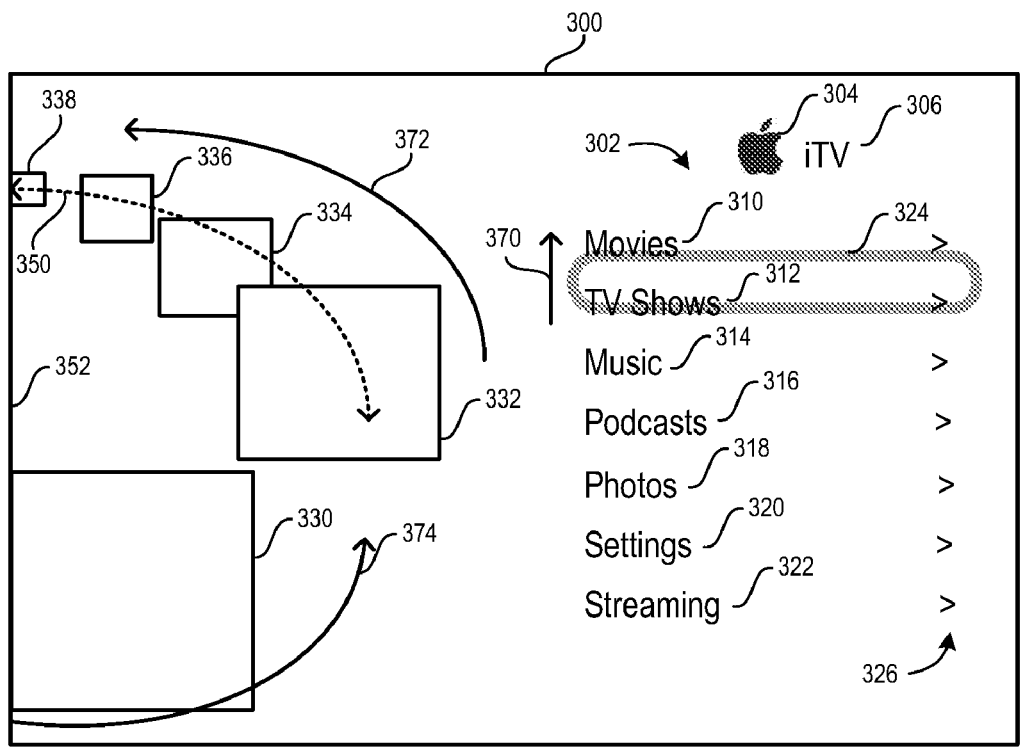
FIG. 7 is a block diagram of another example transition of media icons in the media menu interface environment.

FIG. 7 is a block diagram of another example transition of media menu item abstractions in the media menu interface environment 300. In FIG. 7, the highlight indicator 324 is transitioned from media menu item 312 to media menu item 310, as indicated by the directional arrow 370. In response, the media menu item abstractions 332, 334, 336 and 338 transition along the multidimensional path 350, as indicated by the directional arrow 372. During the transition, the media menu item abstraction 332 also transitions from a foreground position to a background position, and the media menu item abstraction 338 transitions from the terminus position out of the media menu interface environment 300 through the edge 352. As the media menu item abstraction 338 transitions out of the terminus position, another media menu item abstraction 336, which corresponds to the Podcasts media menu item 316, emerges into the terminus position.

The media menu item abstraction 330, which corresponds to the Movies menu item 310 which is to be highlighted by the highlight indicator 324, emerges from the edge 352 and back into the foreground position, as indicated by the directional arrow 374. In the example implementation shown in FIG. 7, the media menu item abstraction 330 emerges from the edge 352 of the media menu interface environment at an increased scale to simulate a "fly by" effect. For example, the scale of the media menu item abstraction 330 can be proportionally decreased from 150% to 100% of full scale as the media menu item abstraction 330 transitions from the edge 352 of the media menu interface environment 300 to the foreground position.

Once the transitions indicated by the directional arrows 370, 372 and 374 are complete, the media menu interface environment 300 returns to the state as depicted in FIG. 4.

Figure 8:
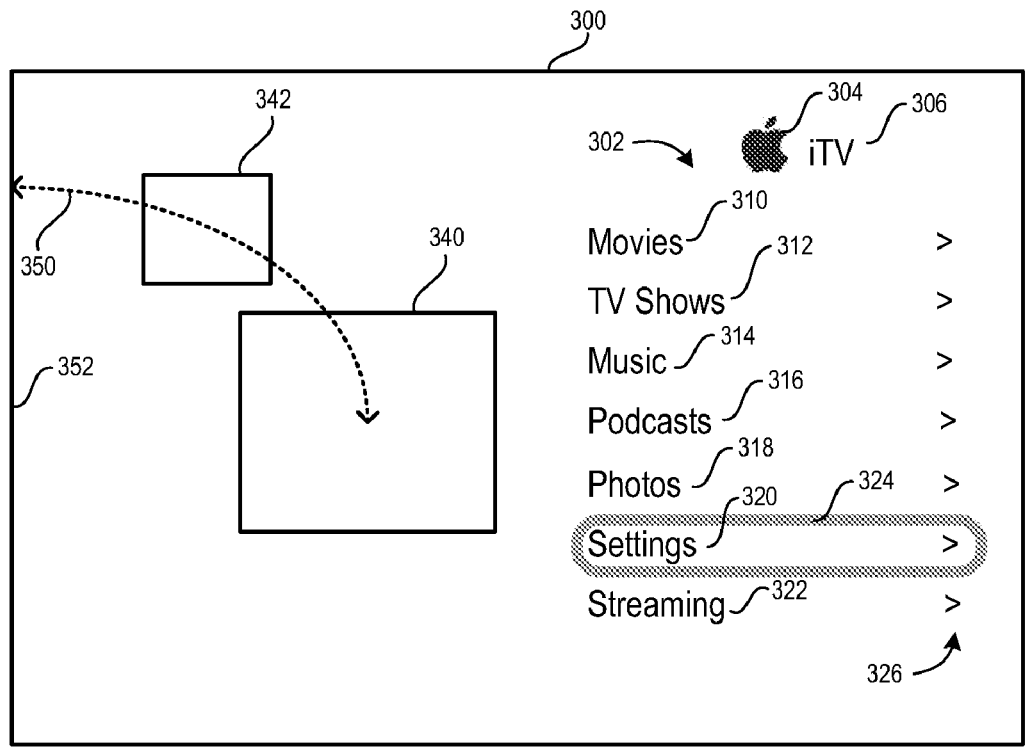
FIG. 8 is a block diagram of an example display of media icons based on a selected menu item.

FIG. 8 is a block diagram of an example display of media menu item abstractions based on a selected menu item 320. In this example implementation, the highlight indicator 324 can transition vertically between media menu items 310 and 322, but does not wrap between media menu items 310 and 322. Thus to return the highlight indicator 324 to the media menu item 310, the highlight indicator 324 must transition through the media menu items 318, 316, 314 and 312. The media menu item abstractions 340 and 342 transition through the multidimensional path in a similar manner. For example, transitioning the highlight indicator 324 to the Streaming media menu item 322 will cause the media menu item abstraction 340 to transition out of the media menu interface environment 300 through the edge 352, and cause the media menu item abstraction 342 to transition from the background position into the foreground position. In the example implementation of FIG. 8, the highlight indicator 324 cannot transition beyond the Streaming media menu item 322, and thus additional media menu item abstractions do not transition into the terminus position.

Likewise, transitioning the highlight indicator 324 to the photos media menu item 318 will cause the media menu item abstraction 340 to transition into a background position and the media menu item abstraction 342 to transition further into the background positions, and will also cause the media menu item abstraction 338 to emerge into the foreground position.

Figure 9:
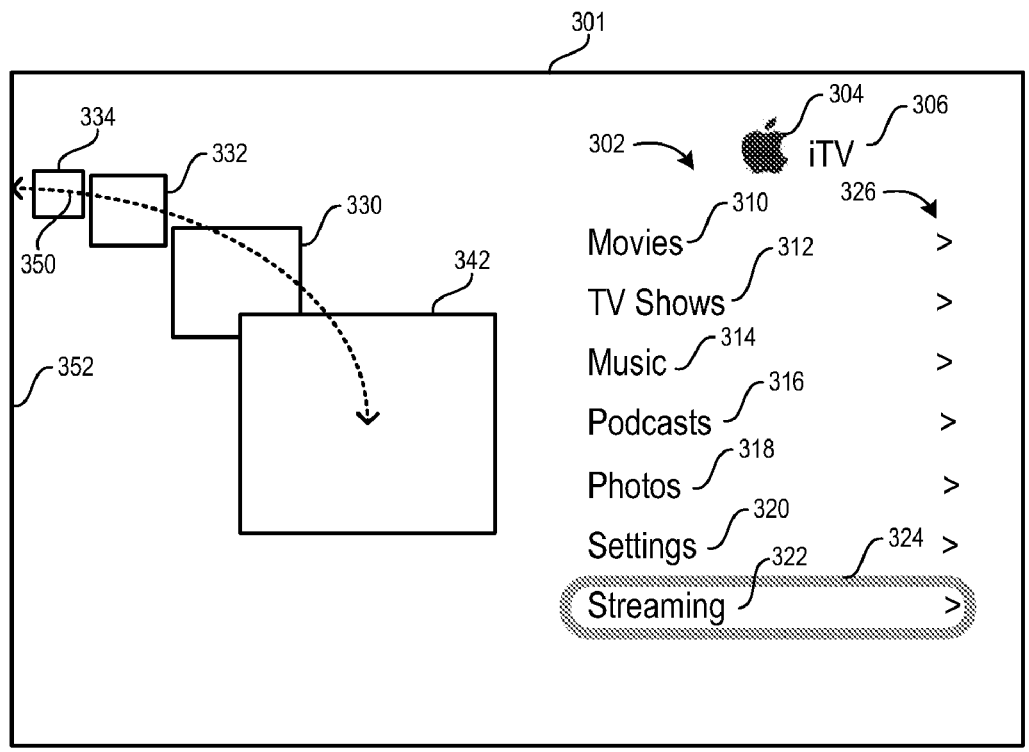
FIG. 9 is a block diagram of another example media menu interface environment.

FIG. 9 is a block diagram of another example media menu interface environment 301. In this example implementation, the highlight indicator 324 can transition vertically between media menu items 310 and 322, and can wrap between media menu items 310 and 322. Thus, to return the highlight indicator 324 to the media menu item 310, the highlight indicator 324 can transition out of the bottom of the media menu 302 and reappear at the top of the media menu 302, beneath the icon 304. The media menu item abstraction 342 thus transitions out of the media menu interface environment 301. Additionally, the media menu item abstractions 330, 332 and 334 transition through the background positions, and the media menu item abstraction 336 emerges from the edge 352 into the terminus position.

Figure 10:
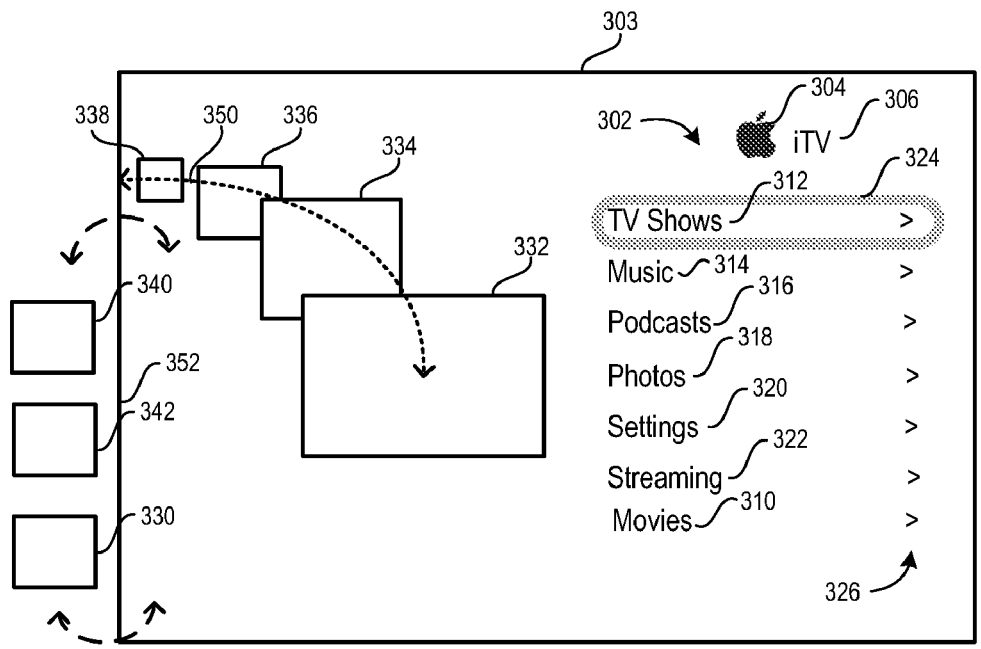
FIG. 10 is a block diagram of another example media menu interface environment.

FIG. 10 is a block diagram of another example media menu interface environment 303. In this example implementation, the highlight indicator 324 is stationary, and the media menu items 310-322 vertically wrap in an up or down direction in response to a command to change a highlighted media menu item. The media menu items 330-342 likewise transition in a corresponding manner, similar to the transitions described with respect to FIG. 9 above. As shown in FIG. 10, the TV Shows media menu item 312 is highlighted, and thus the media menu item abstractions 332, 334, 336 and 338 are arranged in the foreground and background positions as indicated. The remaining media menu item abstractions 340, 342 and 330 can emerge into the media menu interface environment 303 in corresponding order, depending on the direction in which the media menu items 310-322 are scrolled.

Figure 11:
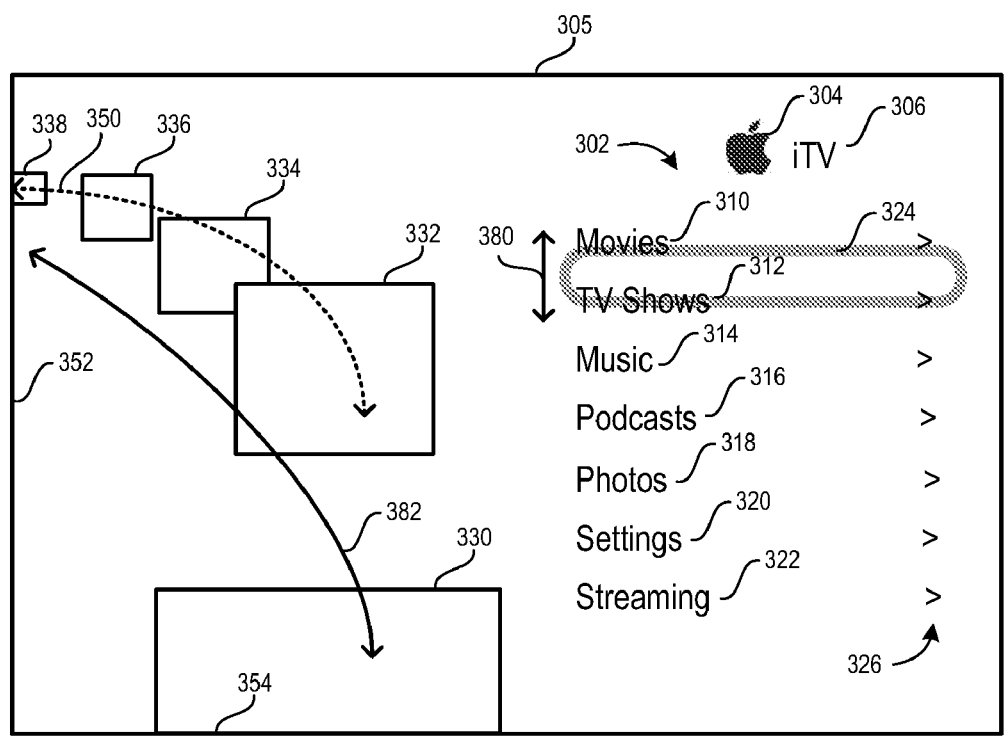
FIG. 11 is a block diagram of another example transition of media icons in the media menu interface environment.

FIG. 11 is a block diagram of another example media menu interface environment 305. The example implementation of FIG. 11 can transition the media menu item abstractions 330-342 in a similar manner as described with reference to FIGS. 4-9, however, the media menu item abstractions 330-342 transition out the menu interface environment 305 through another edge 354.

Other processes can be implemented to illustrate a transition of a media menu item abstraction out of the media menu interface environment. For example, in one implementation, a media menu item abstraction is increased in size and fades out, simulating an effect of vertically launching from the media menu interface environment. In another implementation, a media menu item abstractions follows a straight path, or a linear path, from the foreground position out of the media menu interface environment. Other visual effects can also be used.

Figure 12:
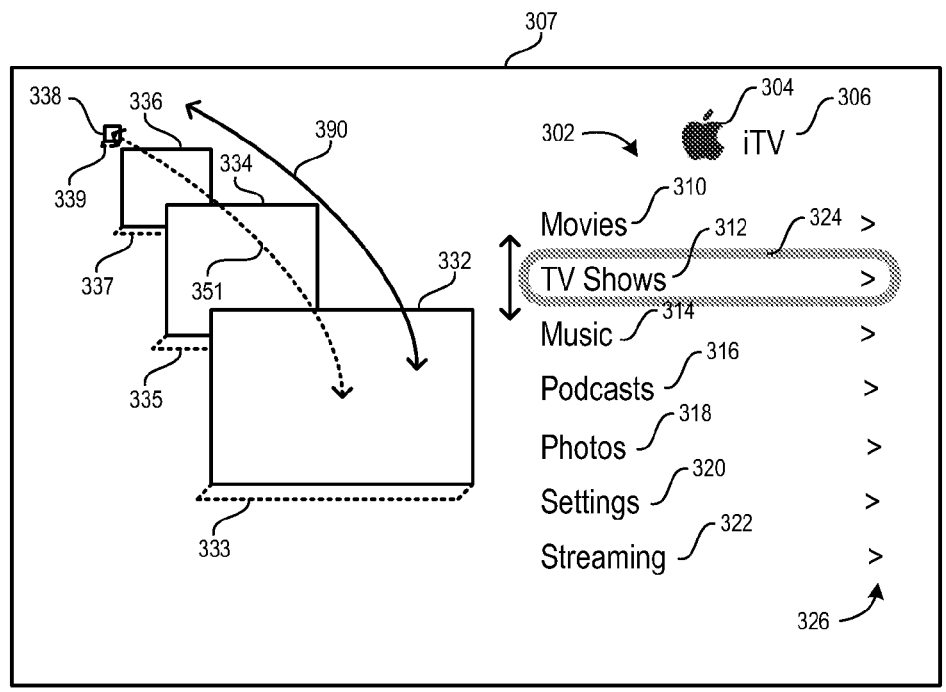
FIG. 12 is a block diagram of another example media menu interface environment.

FIG. 12 is a block diagram of another example media menu interface environment 307. In the example media menu interface environment 307, the media menu item abstractions are arranged in foreground and background positions, and one of the background positions is near a terminus of a multidimensional path 351. The terminus is defined by a vanishing point, and the media menu item abstractions emerge into the menu interface environment 307 from the vanishing point when the media menu item abstractions are transitioning from the background positions into the foreground positions, and transition out of the menu interface environment 307 at the vanishing point when the media menu item abstractions are transitioning from the foreground position into the background positions, as indicated by directional arrow 390.

In another implementation, the media menu item abstractions can include a reflection effect. For example, the media menu item abstractions 332, 334, 336 and 338 include reflections 333, 335, 337 and 339. The reflection effect further emphasizes a multidimensional visual effect, and can be implemented in any of the implementations described herein.

In another implementation, the number of media menu item abstractions displayed along the multidimensional path 350 can vary depending on the size of the media menu item abstractions. For example, the media processing system 100 may normally display four media menu item abstractions; however, if the media menu item abstractions are increased or decreased in display size, the number of media menu item abstractions to be displayed can be decreased or increased, respectively.

In the example implementations described above, the transitioning of the media menu item abstractions corresponds to the transitioning of the highlight indicator 324, e.g., as the highlight indicator 324 transitions from one media menu item to the next, the media menu item abstractions likewise transition through the multidimensional path 350 in a substantially synchronous manner.

In another implementation, the media menu item abstractions do not transition until the highlight indicator 324 has settled on a media menu item and no further commands to transition the highlight indicator 324 are received. In yet another implementation, the media menu item abstractions and the highlight indicator 324 transition substantially instantaneously, e.g., within several video frames or within one video frame. Other transition animations may also be used.

Figure 13:
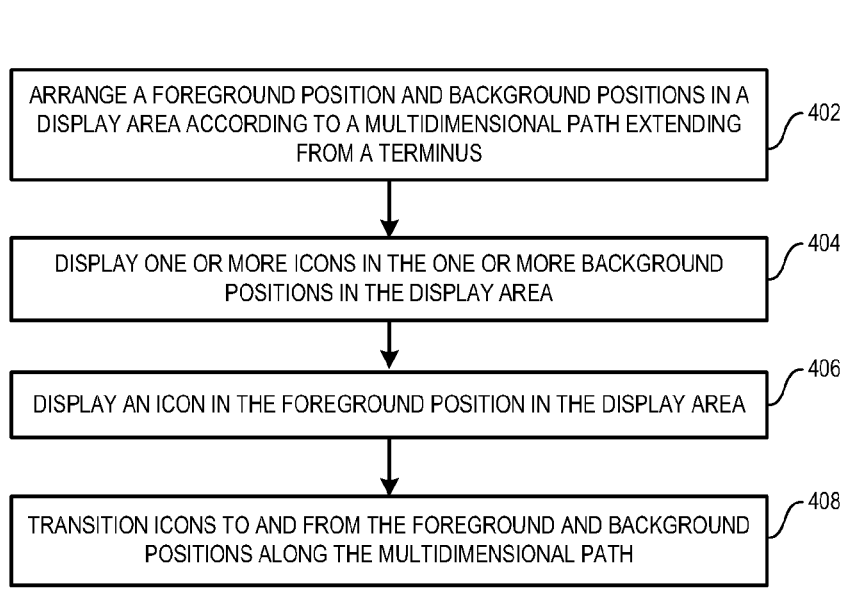
FIG. 13 is a flow diagram of an example icon display process.

FIG. 13 is a flow diagram of an example icon display process 400. In one example implementation, the processing device 104 and/or UI engine 114 can perform operations to implement the process 400.

Stage 402 arranges a foreground position and background positions in a display area according to a multidimensional path extending from a terminus. For example, the processing device 104 and/or UI engine 114 can arrange the media menu item abstractions according to the multidimensional path 350 of FIG. 4 or the multidimensional path 351 of FIG. 12.

Stage 404 displays one or more icons in the one or more background positions in the display area. For example, the processing device 104 and/or UI engine 114 can display one or more media menu item abstractions in one or more background positions.

Stage 406 displays an icon in the foreground position in the display area. For example, the processing device 104 and/or UI engine 114 can display one or more media menu item abstractions, e.g., media icons in foreground positions.

Stage 408 transitions icons from the foreground and background positions along the multidimensional path. For example, the processing device 104 and/or UI engine 114 can transition the media menu item abstractions as described with reference to FIGS. 4-12 above.

Figure 14:
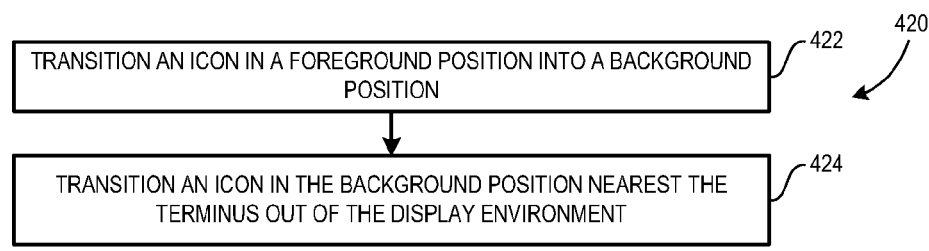
FIG. 14 is a flow diagram of an example icon transition process.

FIG. 14 is a flow diagram of an example icon transition process 420. In one example implementation, the processing device 104 and/or UI engine 114 can perform operations to implement the process 420.

Stage 422 transitions an icon in the foreground position into a background position. For example, the processing device 104 and/or UI engine 114 can transition a media menu item abstraction from a foreground position to a background position.

Stage 424 transitions an icon in the background position nearest the terminus of the multidimensional path out of the display environment. For example, the processing device 104 and/or UI engine 114 can transition media menu item abstractions in the terminus position out of the display environment.

Figure 15:
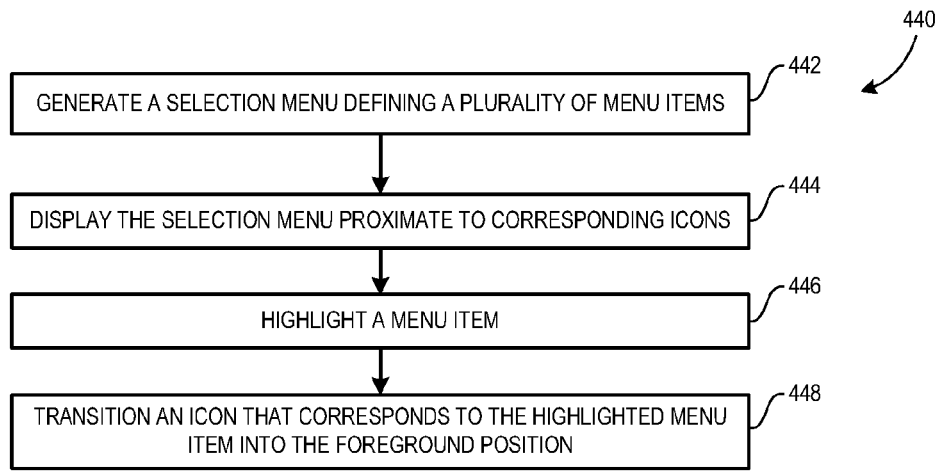
FIG. 15 is a flow diagram of another example icon transition process.

FIG. 15 is a flow diagram of another example icon transition process 440. In one example implementation, the processing device 104 and/or UI engine 114 can perform operations to implement the process 440.

Stage 442 generates a selection menu defining a plurality of menu items. For example, the processing device 104 and/or UI engine 114 can generate the media menu 302 and media menu items 310-322.

Stage 444 displays the selection menu proximate to corresponding icons. For example, the processing device 104 and/or UI engine 114 can display the media menu 302 proximate to the media menu item abstractions 330-342.

Stage 446 highlights a menu item. For example, the processing device 104 and/or UI engine 114 can generate the highlight indicator 324 to highlight a menu item.

Stage 448 transitions an icon that corresponds to the highlighted menu item into the foreground position. For example, the processing device 104 and/or UI engine 114 can transition a media menu item abstraction into the foreground position.

Figure 16:
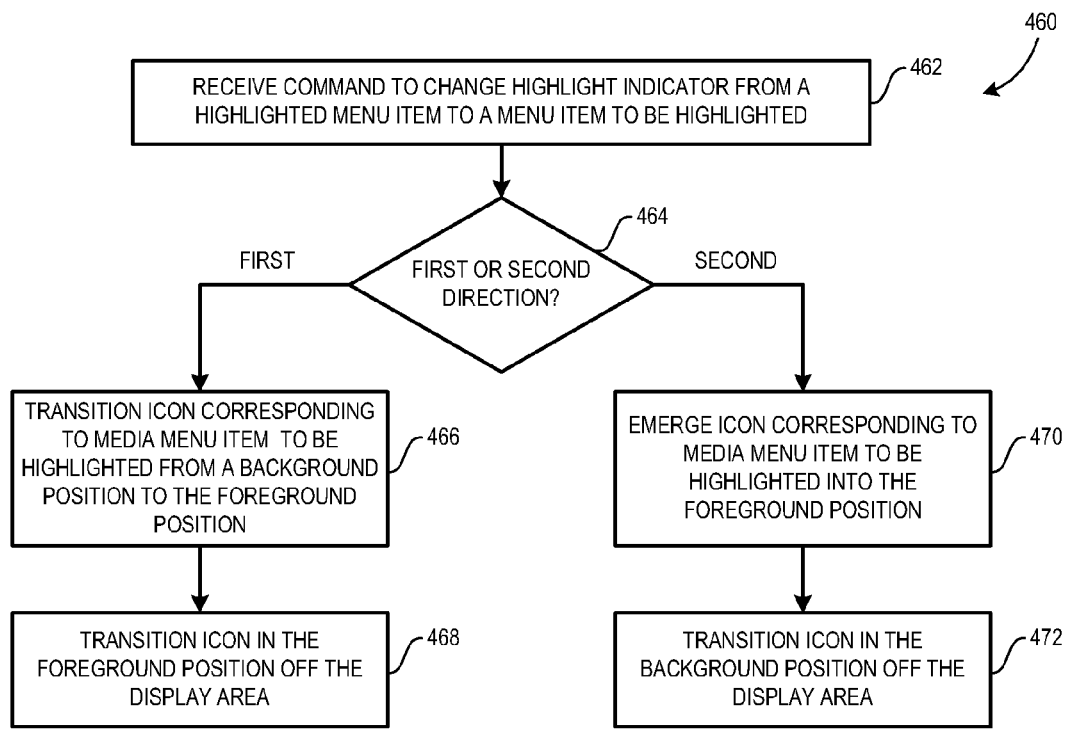
FIG. 16 is a flow diagram of another example icon transition process.

FIG. 16 is a flow diagram of another example icon transition process 460. In one example implementation, the processing device 104 and/or UI engine 114 can perform operations to implement the process 460.

Stage 462 receives a command to change the highlight indicator from a highlighted menu item to a menu item to be highlighted. For example, the processing device 104 and/or UI engine 114 can receive a command to change the highlight indicator 324 from a highlighted media menu item to a media menu item to be highlighted.

Stage 464 determines if the direction of the highlight indicator during transition is in a first direction or a second direction. For example, the processing device 104 and/or UI engine 114 can determine if the highlight indicator 324 is transitioning in an up direction or a down direction. While an example two direction method is described, other multi-directional methods for traversing more or less complicated paths can be used.

If the direction is in the first direction, stage 466 transitions the icon corresponding to the media menu item to be highlighted from a background position to the foreground position. For example, the processing device 104 and/or UI engine 114 can transition a media menu item abstraction from a background position to a foreground position.

If the direction is in the first direction, stage 468 transitions the highlighted icon in the foreground position off the display area. For example, the processing device 104 and/or UI engine 114 can transition a highlighted media menu item abstraction off the media menu interface environment 300.

If the direction is in the second direction, stage 470 emerges the icon corresponding to the media menu item to be highlighted into the foreground position. For example, the processing device 104 and/or UI engine 114 can emerge a media menu item abstraction into the foreground position.

If the direction is in the second direction, stage 472 transitions an icon in the background position off the display area. For example, the processing device 104 and/or UI engine 114 can transition a media menu item abstraction in the terminus position off the media menu interface environment 300.

The stages recited in the example processes of FIGS. 13-16 need not be performed in the example orders set forth.

Figure 17:
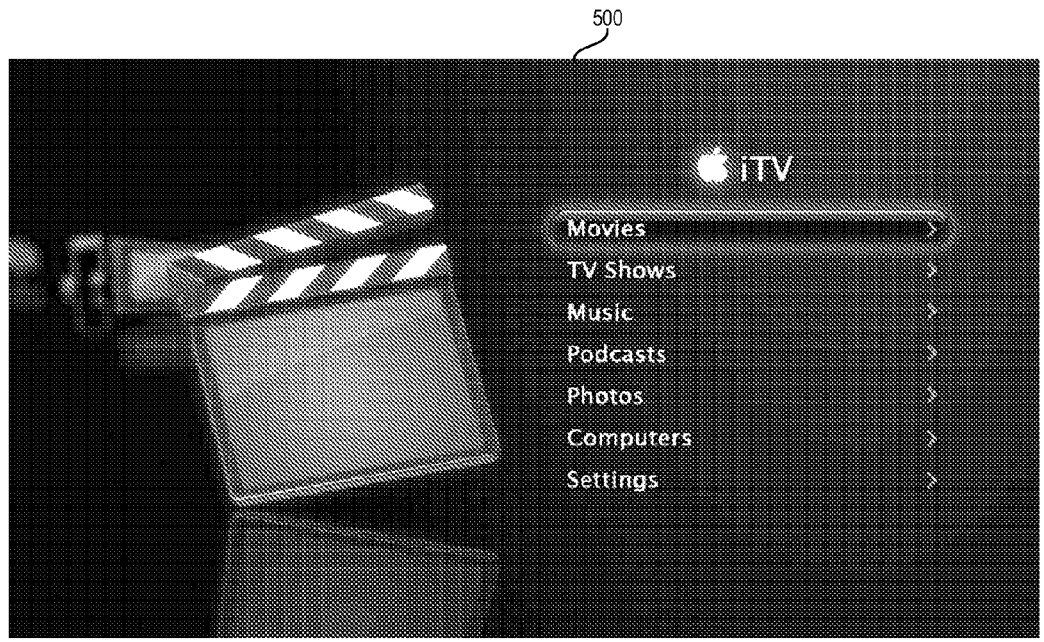
FIGS. 17-20 are screenshots of another example media menu interface environment.

FIGS. 17-20 are screenshots of another example media menu interface environment. The screenshot 502 of FIG. 17 shows the "Movies" menu item highlighted by a highlight indicator. A corresponding Movie icon is displayed in a foreground position, and other menu-related icons are blurred in the background positions. Each displayed icon also has a reflection depicted.

Figure 18:
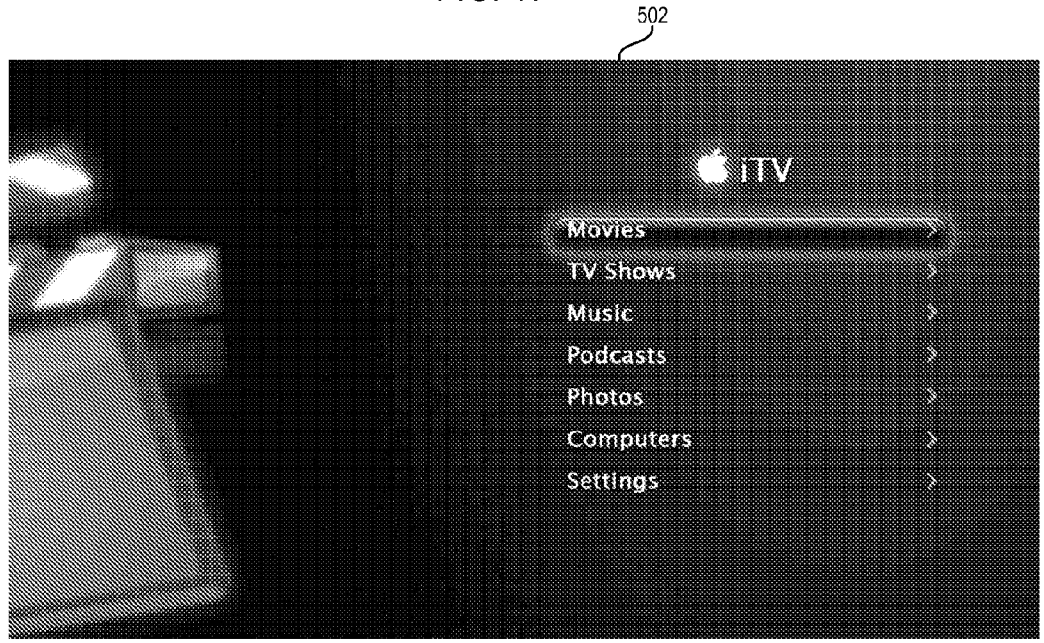
Figure 19:
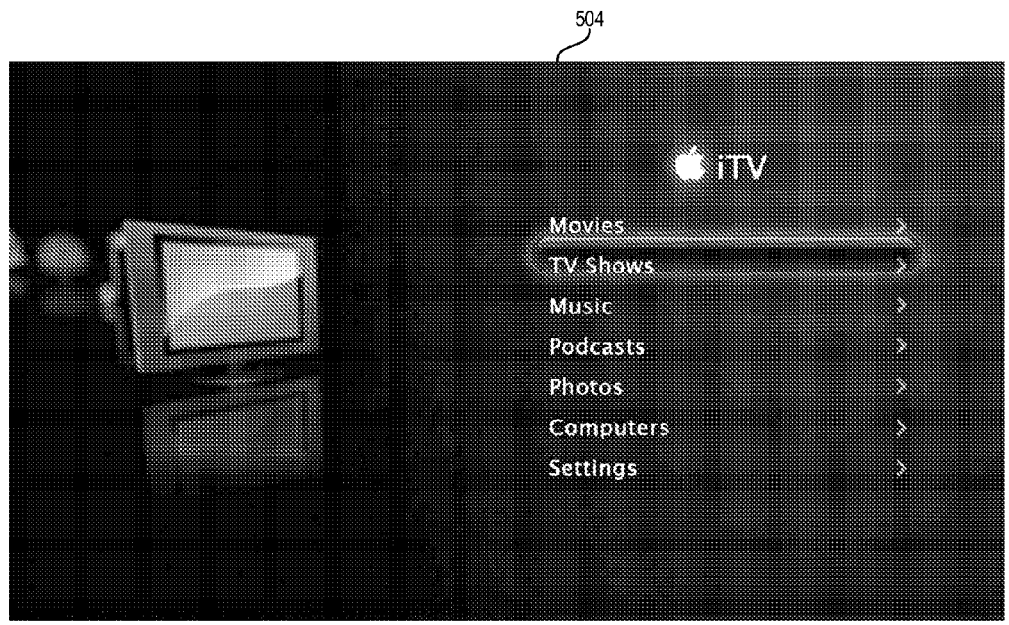

The screenshots 502 and 504 of FIGS. 18 and 19 show two separate frames during a transition of the highlight indicator from the "Movies" menu item to the "TV Shows" menu item. As the highlight indicator transitions, the Movie icon transitions off the edge of the interface environment, and the background icons transition in a forward direction, with the TV Shows icon transitioning into the foreground position.

Figure 20:
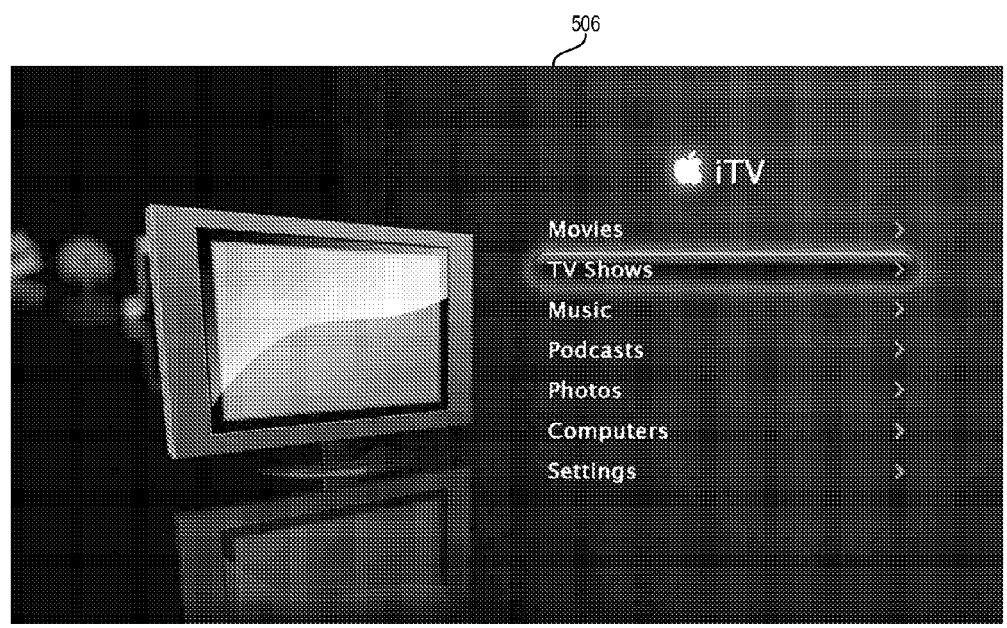

The screenshot 506 of FIG. 20 shows the end result of the transition. The "TV shows" menu item highlighted by a highlight indicator and the corresponding TV Shows icon is displayed in the foreground position.

In another implementation, only one media menu item abstraction is shown in the foreground position, and additional media menu item abstractions are not shown in the background position. In this implementation, the media menu item abstractions that to do not correspond to the highlighted menu item transition off the display area through the multidimensional path as described above, e.g., through the terminus position if transitioning into the background position, or by being displaced by a media menu item abstraction emerging into the terminus position and transitioning from the background into the foreground position. Accordingly, only the media menu item abstraction corresponding to the highlighted menu item is shown.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method, comprising:
generating in a display device an interface environment;
generating in the display device a plurality of icons, one of the icons displayed in a foreground position and the remaining icons displayed in background positions in the interface environment, the foreground and background positions arranged along a multidimensional path, and one of the background positions defining a terminus position representative of a terminus of the multidimensional path, wherein the icons transition between the foreground position and the background positions along the multidimensional path;
generating in the display device a selection menu defining a plurality of content-specific menu items displayed in corresponding menu item positions arranged along a one-dimensional path separate from the multidimensional path, each menu item corresponding to and representing a respective movies content type, music content type, television programs content type, and photos content type, and each content type represented by each menu item being different from the content types represented by the other menu items, and wherein each of the plurality of icons corresponds to only a respective one of the plurality of menu items, and each icon is representative of only the content type of its corresponding menu item so that each of the movies content type, music content type, television programs content type and photos content type is represented by only one respective menu item and one respective icon, and the plurality of icons and the plurality of menu items are concurrently displayed; and
generating in the display device a highlight indicator configured to highlight a menu item to generate a highlighted menu item, the highlighted menu item corresponding to the icon in the foreground position, wherein changing the highlight indicator from the highlighted menu item to another menu item to be highlighted causes an icon corresponding to the another menu item to transition from a background position to the foreground position;
wherein a relative proximity of a menu item to its corresponding icon changes in relation to a position of the highlight indicator relative to the menu item.

2. The computer-implemented method of claim 1, wherein:
one or more of the icons displayed in the background positions are blurred.

3. The computer-implemented method of claim 1, wherein:
the selection menu is displayed proximate to the plurality of icons.

4. The computer-implemented method of claim 1, wherein:
the terminus of the multidimensional path is at an edge of the interface environment, and changing the highlight indicator from the highlighted menu item to the another menu item to be highlighted causes another icon to emerge from the edge of the interface environment into the terminus position.

5. The computer-implemented method of claim 1, wherein:
the plurality of icons correspond to a subset of the plurality of menu items; and
changing the highlight indicator in a first direction from the highlighted menu item to another menu item to be highlighted causes an icon corresponding to the another menu item to transition from a background position to the foreground position; and
changing the highlight indicator in a second direction from the highlighted menu item to another menu item to be highlighted causes an icon corresponding to the another menu item not in the background positions to emerge into the foreground position.

6. The computer-implemented method of claim 5, wherein:
changing the highlight indicator in the second direction from the highlighted menu item to the another menu item to be highlighted causes the icon corresponding to highlighted menu item to transition into one of the background positions, and causes an icon in the terminus position to transition out of the interface environment.

7. The computer-implemented method of claim 6, wherein:
an icon in the terminus position transitions off an edge of the interface environment.

8. The computer-implemented method of claim 6, wherein:
an icon in the terminus position transitions into a vanishing point.

9. The computer-implemented method of claim 1, wherein:
a user input corresponding to a selection of a first icon not in the foreground position causes the first icon to transition along the multidimensional path into the foreground position.

10. The computer-implemented method of claim 9, wherein:
the first icon transitions along the multidimensional path into the foreground position from a background position, and one or more icons emerge into the terminus position.

11. The computer-implemented method of claim 10, wherein:
the one or more icons emerge into the terminus position from a vanishing point.

12. The computer-implemented method of claim 9, wherein:
the first icon emerges into the foreground position and an icon in the foreground position transitions into one of the background positions.

13. The computer-implemented method of claim 1, wherein:
the icons are proportionally scaled from a largest size in the foreground position to a smallest size in the terminus position.

14. The computer-implemented method of claim 1, wherein:
the multidimensional path defines an arcuate path.

15. The computer-implemented method of claim 1, further comprising:
generating in the display device a plurality of icon reflections, each icon reflection adjacent an icon.

16. A computer-implemented method, comprising:
arranging a foreground position and one or more background positions in a display area according to a multidimensional path extending from a terminus;
displaying one or more icons in the one or more background positions in the display area;
displaying an icon in the foreground position in the display area;
arranging menu item positions in the display area according to a one-dimensional path separate from the multidimensional path;
displaying content-specific menu items in corresponding menu item positions, wherein each of the one or more icons in the one or more background positions and the icon in the foreground position correspond to only a respective one the menu items, and wherein the icons and the menu items are concurrently displayed, each menu item corresponds to and represents a respective movies content type, music content type, television programs content type, and photos content type, and each content type represented by each menu item is different from the content types represented by the other menu items, and each icon is representative of only the content type of its corresponding menu item so that each of the movies content type, music content type, television programs content type, and photos content type is represented by only one respective menu item and one respective icon; and
highlighting a menu item by use of a highlight indicator to generate a highlighted menu item, the highlighted menu item corresponding to the icon in the foreground position, wherein changing the highlight indicator from the highlighted menu item to another menu item to be highlighted causes an icon corresponding to the another menu item to transition from a background position to the foreground position;
wherein a relative proximity of a menu item to its corresponding icon changes in relation to a position of the highlight indicator relative to the menu item.

17. The computer-implemented method of claim 16, further comprising:
transitioning an icon in the foreground position into a background position; and
transitioning an icon in the background position nearest the terminus off an edge of the display area.

18. The computer-implemented method of claim 16, further comprising:
transitioning an icon in the foreground position into a background position; and
transitioning an icon in the background position nearest the terminus into a vanishing point.

19. The computer-implemented method of claim 16, further comprising:
emerging an icon from an edge of the display area into the foreground position.

20. The computer-implemented method of claim 16, further comprising:
blurring one or more icons in the one or more background positions.

21. The computer-implemented method of claim 16, further comprising:
altering the number of icons displayed in the one or more background positions based on a display size of the icon in the foreground position and the display sizes of the icons in the one or more background positions.

22. The computer-implemented method of claim 16, further comprising:
emerging one or more icons into the background positions from the background position nearest the terminus.

23. The computer-implemented method of claim 16, further comprising:
emerging one or more icons from an edge of the display area into the foreground position;

transitioning one or more icons from the foreground position into one or more background positions; and transitioning one or more icons in the background position nearest the terminus out of the display area.

24. The computer-implemented method of claim 16, further comprising:

proportionally scaling the icons from a largest size in the foreground position to a smallest size in background position nearest the terminus.

25. A system, comprising:

a processing device;

a user interface engine executable by the processing device and configured to:

arrange a foreground position and background positions in a user environment according to a multidimensional path so that the multidimensional path intersects an edge of the user environment;

display icons in background positions;

display an icon in the foreground position;

arrange menu item positions in the user environment according to a one-dimensional path separate from the multidimensional path;

display content-specific menu items in corresponding menu item positions, wherein each of the icons corresponds to the only a respective one of the menu items and the icons and the menu items are concurrently displayed, each menu item corresponds to and represents a respective movies content type, music content type, television programs content type, and photos content type, and each content type represented by each menu item is different from the content types represented by the other menu items, and each icon is representative of only the content type of its corresponding menu item so that each of the movies content type, music content type, television programs content type, and photos content type is represented by only one respective menu item and one respective icon; and highlight a menu item by use of a highlight indicator to generate a highlighted menu item, the highlighted menu item corresponding to the icon in the foreground position, wherein changing the highlight indicator from the highlighted menu item to another menu item to be highlighted causes an icon corresponding to the another menu item to transition from a background position to the foreground position;

wherein a relative proximity of a menu item to its corresponding icon changes in relation to a position of the highlight indicator relative to the menu item.

26. The system of claim 25, wherein the user interface engine is further configured to:

transition an icon in the foreground position into a background position; and transition an icon in the background position nearest the edge of the user environment out of the user environment.

27. The system of claim 25, wherein the user interface engine is further configured to:

emerge an icon from the edge of the user environment into the foreground position.

28. The system of claim 25, wherein the user interface engine is further configured to:

emerge an icon from another edge of the user environment into the foreground position.

29. An apparatus implemented in program code comprising program instructions that upon execution by a processing device cause the processing device to perform operations comprising:

displaying on a display device one or more content type abstractions in one or more background positions in a user interface;

displaying on the display device a content type abstraction in a foreground position in the user interface, wherein each content type abstraction corresponds to and represents a respective content type, each content type for each content type abstraction being different from the content types of the other content type abstractions;

arranging the content type abstractions displayed in the foreground position and the one or more background positions according to a multidimensional path extending from a terminus in the user interface; and displaying on the display device a selection menu defining a plurality of content-specific menu items displayed in corresponding menu item positions arranged according to a one-dimensional path separate from the multidimensional path, and wherein each of the content type abstractions corresponds to only a respective one of the plurality of menu items, and each menu item represents a respective movies content type, music content type, television programs content type, and photos content type, and each content type represented by each menu item is different from the content types represented by the other menu items, and each content type abstraction is representative of only the content type of its corresponding menu item so that each of the movies content type, music content type, television programs content type, and photos content type is represented by only one respective menu item and one respective content type abstraction and the plurality of content type abstractions and the plurality of menu items are concurrently displayed; and highlighting a menu item by use of a highlight indicator to generate a highlighted menu item, the highlighted menu item corresponding to the content type abstraction in the foreground position, wherein changing the highlight indicator from the highlighted menu item to another menu item to be highlighted causes a content type abstraction corresponding to the another menu item to transition from a background position to the foreground position;

wherein a relative proximity of a menu item to its corresponding content type abstraction changes in relation to a position of the highlight indicator relative to the menu item.

30. The apparatus of claim 29, storing further instructions that upon execution by the processing device cause the processing device to perform operations comprising:

transitioning a content type abstraction in the foreground position into a background position; and transitioning a content type abstraction in the background position nearest the terminus out of the user interface.

31. The apparatus of claim 29, storing further instructions that upon execution by the processing device cause the processing device to perform operations comprising:

transitioning a content type abstraction in the foreground position into a background position; and transitioning a content type abstraction in the background position nearest the terminus into a vanishing point.

32. The apparatus of claim 29, storing further instructions that upon execution by the processing device cause the processing device to perform operations comprising:

emerging a content type abstraction from an edge of the user interface into the foreground position.

33. The apparatus of claim 29, storing further instructions that upon execution by the processing device cause the processing device to perform operations comprising:
proportionally scaling the content type abstractions from a largest size in the foreground position to a smallest size in background position nearest the terminus.

34. The apparatus of claim 29, wherein:
the content type abstractions comprises icons.

35. The method of claim 1, wherein changing the highlight indicator from the highlighted menu item to another menu item to be highlighted causes comprises:
transitioning the highlight indicator from the highlighted menu item to another menu item; and
transitioning the media menu item abstractions though the multidimensional path substantially synchronously with the transitioning of the highlight indicator.

* * * * *

UNITED STATES PATENT AND TRADEMARK OFFICE
CERTIFICATE OF CORRECTION

| | | |
|---|---|---|
| PATENT NO. | : 7,743,341 B2 | Page 1 of 1 |
| APPLICATION NO. | : 11/530796 | |
| DATED | : June 22, 2010 | |
| INVENTOR(S) | : Rainer Brodersen et al. | |

It is certified that error appears in the above-identified patent and that said Letters Patent is hereby corrected as shown below:

In column 5, line 26, delete "one the" and insert -- one of the --, therefor.

In column 6, line 60, delete "sealed" and insert -- scaled --, therefor.

In column 7, line 1, delete "form" and insert -- from --, therefor.

In column 14, line 10, in Claim 16, delete "one the" and insert -- one of the --, therefor.

In column 18, line 6, in Claim 35, delete "though" and insert -- through --, therefor.

Signed and Sealed this
Eighth Day of November, 2011

David J. Kappos
*Director of the United States Patent and Trademark Office*